US012798564B2

(12) United States Patent
Ishikawa et al.

(10) Patent No.: US 12,798,564 B2
(45) Date of Patent: Nov. 17, 2026

(54) DRIVING ASSISTANCE DEVICE, DRIVING ASSISTANCE METHOD, AND PROGRAM

(71) Applicant: HONDA MOTOR CO., LTD., Tokyo (JP)

(72) Inventors: Shunya Ishikawa, Wako (JP); Keisuke Oka, Wako (JP); Shinya Maruo, Wako (JP); Yohei Kitahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 18/847,271

(22) PCT Filed: Mar. 18, 2022

(86) PCT No.: PCT/JP2022/012564
§ 371 (c)(1),
(2) Date: Sep. 16, 2024

(87) PCT Pub. No.: WO2023/175884
PCT Pub. Date: Sep. 21, 2023

(65) Prior Publication Data
US 2025/0206293 A1 Jun. 26, 2025

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 50/16; B60W 2554/406
See application file for complete search history.

(56) References Cited

U.S. PATENT DOCUMENTS

| | | | | |
|---|---|---|---|---|
| 2021/0295682 | A1* | 9/2021 | Inoue | H04W 4/021 |
| 2022/0135079 | A1* | 5/2022 | Ito | B60Q 1/507 701/23 |
| 2022/0227420 | A1* | 7/2022 | Shimanaka | B60W 30/09 |

FOREIGN PATENT DOCUMENTS

| | | |
|---|---|---|
| JP | 2006-044591 | 2/2006 |
| JP | 2017-208898 | 11/2017 |

(Continued)

OTHER PUBLICATIONS

International Search Report and Written Opinion for International Application No. PCT/JP2022/012564 mailed on May 24, 2022, 11 pages.

*Primary Examiner* — Andrew J Cromer
(74) *Attorney, Agent, or Firm* — Amin, Turocy & Watson, LLP

(57) ABSTRACT

A driving assistance device performs a second preliminary operation when a degree of proximity between a target object and a vehicle satisfies a third condition and it is determined that there is no space in which the vehicle is able to proceed after avoidance by the steering is performed in any of tracks to sides of the target object at a time point when the third condition is satisfied, and performs a third preliminary operation when presence of the target object is unknown and tracks to sides of a track on which the vehicle is present are in a congested state.

12 Claims, 9 Drawing Sheets

(51) Int. Cl.

| | |
|---|---|
| ***B60W 10/20*** | (2006.01) |
| ***B60W 30/095*** | (2012.01) |
| ***B60W 50/14*** | (2020.01) |
| ***B60W 50/16*** | (2020.01) |

(52) U.S. Cl.

CPC ........ *B60W 30/0956* (2013.01); *B60W 50/16* (2013.01); *B60W 2050/143* (2013.01); *B60W 2050/146* (2013.01); *B60W 2554/406* (2020.02); *B60W 2554/802* (2020.02)

(56) References Cited

FOREIGN PATENT DOCUMENTS

| | | |
|---|---|---|
| JP | 2019-098914 | 6/2019 |
| JP | 2020-050010 | 4/2020 |
| JP | 2020-097346 | 6/2020 |

* cited by examiner

DRIVING ASSISTANCE DEVICE, DRIVING ASSISTANCE METHOD, AND PROGRAM

TECHNICAL FIELD

The present invention relates to a driving assistance device, a driving assistance method, and a program.

BACKGROUND ART

In recent years, an invention of a vehicle control device that performs automatic deceleration control and automatic steering control has been disclosed (for example, refer to Patent Document 1).

CITATION LIST

Patent Document

Patent Document 1: Japanese Unexamined Patent Application, First Publication No. 2020-50010

SUMMARY OF INVENTION

Technical Problem

In a vehicle capable of performing automatic steering control in addition to automatic deceleration control, the probability of being able to quickly respond to sudden changes in the surrounding environment of the vehicle is high, and a degree of control margin is relatively high. On the other hand, when there is no avoidance space to the sides of a target object, automatic steering control becomes difficult, and the degree of control margin is the same as for a vehicle that only performs automatic deceleration control. In conventional technologies, there are cases where it is not possible to perform operations according to such differences in the environment.

The present invention has been made in consideration of such circumstances, and one of the objects is to provide a driving assistance device, a driving assistance method, and a program that can perform an appropriate preliminary operation according to a surrounding situation of a target object.

Solution to Problem

The driving assistance device, the driving assistance method, and the program according to the present invention have adopted the following configuration.

(1): A driving assistance device according to one aspect of the present invention includes a braking controller configured to refer to an output of a detection device that detects presence of objects in front of a vehicle, and instructs a braking device of the vehicle to stop the vehicle when a degree of proximity between a target object among the objects and the vehicle satisfies a first condition, and a steering avoidance controller configured to instruct a steering device of the vehicle to avoid contact with the target object by steering, in which the braking controller includes a first preliminary operation controller that performs a first preliminary operation when the degree of proximity satisfies a second condition, and further includes a second preliminary operation controller that performs a second preliminary operation when the degree of proximity satisfies a third condition and it is determined that there is no space in which the vehicle is able to proceed after avoidance by the steering is performed in any of tracks to sides of the target object at a time point when the third condition is satisfied, the second preliminary operation controller performs a third preliminary operation when presence of the target object is unknown and tracks to sides of a track on which the vehicle is present are in a congested state, the first condition is a condition that is satisfied when the degree of proximity is higher than the second condition, and the second condition is a condition that is satisfied when the degree of proximity is higher than the third condition.

(2): In the aspect of (1) described above, the second preliminary operation may be an operation started at an earlier timing than the first preliminary operation.

(3): In the aspect of (1) or (2) described above, at least one of the first preliminary operation and the second preliminary operation may be an operation of instructing the braking device to output a braking force smaller than a braking force that the braking controller instructs the braking device to output.

(4): In the aspect of (3) described above, both the first preliminary operation and the second preliminary operation may be operations of instructing the braking device to output a braking force smaller than a braking force that the braking controller instructs the braking device to output, and a braking force that may be initially output in the second preliminary operation is smaller than a braking force that is initially output in the first preliminary operation.

(5): In the aspect of (4) described above, the third preliminary operation may be an operation of instructing an output device to perform display, voice output, or vibration output for calling attention, and then instructing the braking device to output a braking force smaller than a braking force that the braking controller instructs the braking device to output.

(6): In the aspect of any one of (1) to (5) described above, the third preliminary operation may include an operation of instructing the braking device and a traveling drive force output device of the vehicle to suppress acceleration or deceleration of the vehicle until the target object is recognized.

(7): In the aspect of any one of (1) to (6) described above, the second preliminary operation controller may perform the third preliminary operation when the presence of the target object is unknown and all of the tracks to the sides of the track on which the vehicle is present are in a congested state, and may not perform the third preliminary operation when at least one of the tracks to the sides of the track on which the vehicle is present is not in a congested state.

(8): In the aspect of any one of (1) to (6) described above, the second preliminary operation controller may perform the third preliminary operation when the presence of the target object is unknown and all of the tracks to the sides of the track on which the vehicle is present are in a congested state, not perform the third preliminary operation when the presence of the target object is unknown, there are tracks on the left and right of the track on which the vehicle is present, only one of the tracks is in a congested state, and a branch road is connected to the track in a congested state, and perform the third preliminary operation when the presence of the target object is unknown, there are tracks on the left and right of the track on which the vehicle is present, only one of the tracks is in a congested state, and no branch road is connected to the track in a congested state.

(9): A driving assistance method according to another aspect of the present invention includes, by a driving assistance device, referring to an output of a detection device that detects presence of objects in front of a vehicle, and performing one or both of instructing a braking device of the vehicle to stop the vehicle when a degree of proximity between a target object among the objects and the vehicle satisfies a first condition and instructing a steering device of the vehicle to avoid contact with the target object by steering, performing a first preliminary operation when the degree of proximity between the target object and the vehicle satisfies a second condition, performing a second preliminary operation when the degree of proximity between the target object and the vehicle satisfies a third condition and it is determined that there is no space in which the vehicle is able to proceed after avoidance by the steering is performed in any of tracks to sides of the target object at a time point when the third condition is satisfied, and performing a third preliminary operation when presence of the target object is unknown and tracks to sides of a track on which the vehicle are present is in a congested state, in which the first condition is a condition that is satisfied when the degree of proximity is higher than the second condition, and the second condition is a condition that is satisfied when the degree of proximity is higher than the third condition.

(10): A program according to still another aspect of the present invention causes a computer to execute referring to an output of a detection device that detects presence of objects in front of a vehicle, and performing one or both of instructing a braking device of the vehicle to stop the vehicle when a degree of proximity between a target object among the objects and the vehicle satisfies a first condition and instructing a steering device of the vehicle to avoid contact with the target object by steering, performing a first preliminary operation when the degree of proximity between the target object and the vehicle satisfies a second condition, performing a second preliminary operation when the degree of proximity between the target object and the vehicle satisfies a third condition and it is determined that there is no space in which the vehicle is able to proceed after avoidance by the steering is performed in any of tracks to sides of the target object at a time point when the third condition is satisfied, and performing a third preliminary operation when presence of the target object is unknown and tracks to sides of a track on which the vehicle is present are in a congested state, in which the first condition is a condition that is satisfied when the degree of proximity is higher than the second condition, and the second condition is a condition that is satisfied when the degree of proximity is higher than the third condition.

Advantageous Effects of Invention

According to the aspects of (1) to (10) described above, it is possible to perform an appropriate preliminary operation according to a recognized situation of a target object.

DESCRIPTION OF EMBODIMENTS

Hereinafter, an embodiment of a driving assistance device, a driving assistance method, and a program of the present invention will be described with reference to the drawings.

Overall Configuration

Figure 1:
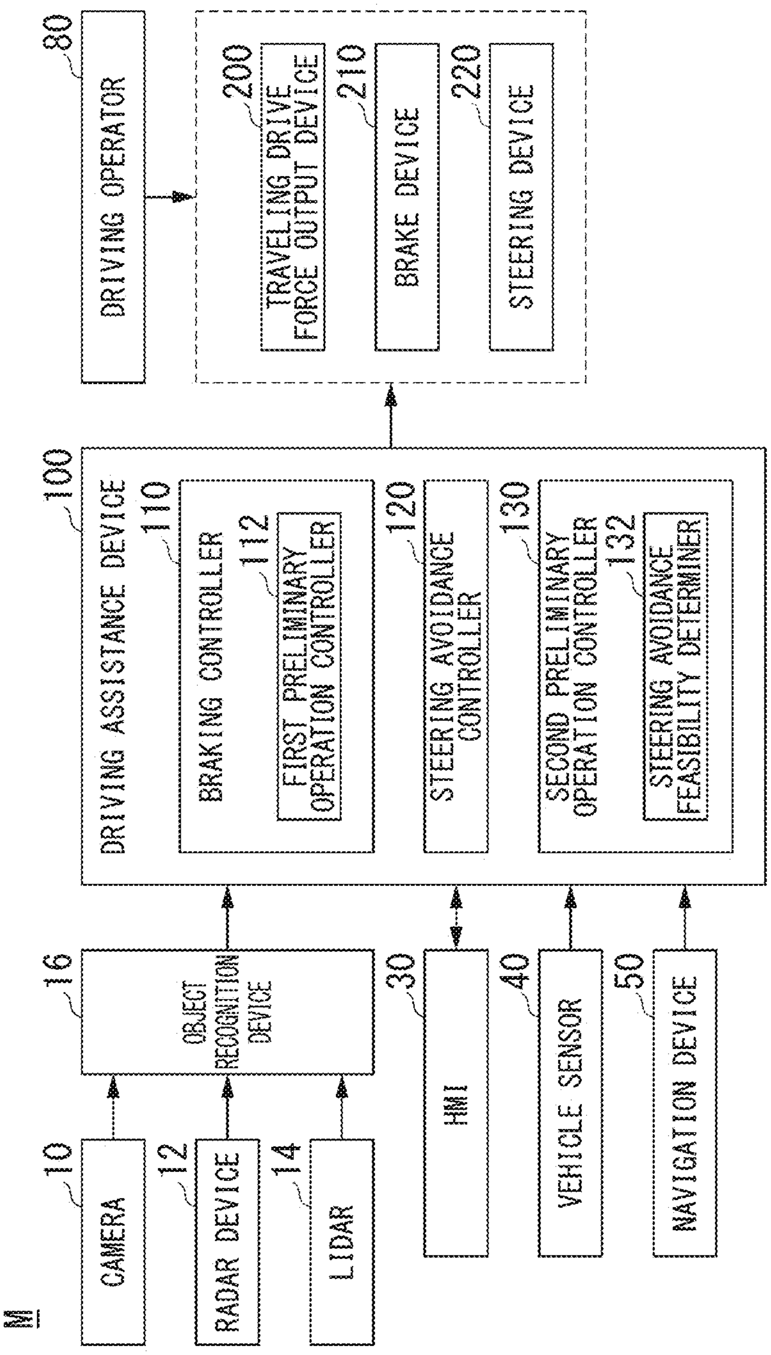
FIG. 1 A configuration diagram of a vehicle equipped with a driving assistance device of an embodiment.

FIG. 1 is a configuration diagram of a vehicle M equipped with a driving assistance device 100 of an embodiment. The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle M is equipped with, for example, a camera 10, a radar device 12, a light detection and ranging (LIDAR) 14, an object recognition device 16, a human machine interface (HMI) 30, a vehicle sensor 40, a driving operator 80, a driving assistance device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as the vehicle M). When an image of the front is captured, the camera 10 is attached to an upper part of the front windshield, a back surface of the windshield rear-view mirror, and the like. The camera 10 periodically and repeatedly captures, for example, a periphery of the vehicle M. The camera 10 may be a stereo camera.

The radar device 12 radiates radio waves such as millimeter waves to the periphery of the vehicle M, and also detects at least a position (a distance and an orientation) of an object by detecting radio waves (reflected waves) reflected by the object. The radar device 12 is attached to an arbitrary place on the vehicle M. The radar device 12 may detect the position and speed of an object in a frequency modulated continuous wave (FM-CW) method.

The LIDAR 14 irradiates the periphery of the vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the vehicle M.

The object recognition device 16 performs sensor fusion processing on a result of detection by some or all of the camera 10, the radar device 12, and the LIDAR 14, and recognizes the position, type, speed, and the like of an object. The object recognition device 16 outputs a result of recognition to the driving assistance device 100. The object recognition device 16 may output the results of detection by the camera 10, the radar device 12, and the LIDAR 14 to the driving assistance device 100 as they are. The object recognition device 16 may be omitted from the vehicle system 1. Some or all of the camera 10, the radar device 12, the LIDAR 14, and the object recognition device 16 are examples of a "detection device."

The HMI 30 presents various types of information to an occupant of the vehicle M and receives an input operation by the occupant. The HMI 30 includes various display devices, speakers, buzzers, vibration generation devices (vibrators), touch panels, switches, keys, and the like.

The vehicle sensor 40 includes a vehicle speed sensor that detects a speed of the vehicle M, an acceleration sensor that detects acceleration, a yaw rate sensor that detects an angular speed around a vertical axis, an azimuth sensor that detects a direction of the vehicle M, and the like.

The navigation device 50 includes, for example, a global navigation satellite system (GNSS) receiver, a guidance controller, and a storage that has stored map information. The GNSS receiver 51 identifies the position of the vehicle M on the basis of a signal received from a GNSS satellite. The position of the vehicle M may be identified or complemented by an inertial navigation system (INS) using an output of the vehicle sensor 40. The guidance controller determines, for example, a route from the position of the vehicle M (or an arbitrary position to be input) identified by the GNSS receiver to a destination to be input by the occupant with reference to the map information, and causes the HMI 30 to output guidance information so that the vehicle M travels along the route. The map information is, for example, information in which a road shape is expressed by a link indicating a road and nodes connected by a link. The map information may include a road curvature, point of interest (POI) information, and the like. The navigation device 50 may transmit a current position of the vehicle M and a destination to a navigation server via the communication device and acquire a route from the navigation server.

The driving operator 80 includes, for example, an accelerator pedal, a brake pedal, a steering wheel, a shift lever, and other operators. The driving operator 80 has a sensor that detects the amount of operation or presence or absence of an operation attached thereto, and a result of the detection is output to some or all of the traveling drive force output device 200, the brake device 210, and the steering device 220.

The traveling drive force output device 200 outputs a traveling drive force (torque) for the vehicle to travel to drive wheels. The traveling drive force output device 200 includes, for example, a combination of an internal combustion engine, an electric motor, and a transmission, and an electronic control unit (ECU) that controls these. The ECU controls the constituents described above according to information input from the driving assistance device 100 or information input from the driving operator 80.

The brake device 210 includes, for example, a brake caliper, a cylinder that transmits hydraulic pressure to the brake caliper, an electric motor that generates hydraulic pressure in the cylinder, and an ECU. The ECU controls the electric motor according to the information input from the driving assistance device 100 or the information input from the driving operator 80, so that a brake torque corresponding to a braking operation is output to each wheel. The brake device 210 may be provided with a backup mechanism that transmits hydraulic pressure generated by operating the brake pedal included in the driving operator 80 to the cylinder via a master cylinder. The brake device 210 is not limited to the constituent described above, and may be an electronically controlled hydraulic brake device that controls an actuator according to the information input from the driving assistance device 100 to transmit the hydraulic pressure of the master cylinder to the cylinder.

The steering device 220 includes, for example, a steering ECU and an electric motor. The electric motor applies force to, for example, a rack and pinion mechanism to change a direction of a steering wheel. The steering ECU drives the electric motor according to the information input from the driving assistance device 100 or the information input from the driving operator 80 to change the direction of the steering wheel.

Driving Assistance Device

The driving assistance device 100 includes, for example, a braking controller 110, a steering avoidance controller 120, a second preliminary operation controller 130. The braking controller 110 includes a first preliminary operation controller 112, and the second preliminary operation controller 130 includes a steering avoidance feasibility determiner 132. These functional units are realized by, for example, a hardware processor such as a central processing unit (CPU) executing a program (software). In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the driving assistance device 100, or may be stored in a detachable storage medium such as a DVD or a CD-ROM and installed in the HDD or flash memory of the driving assistance device 100 by the storage medium (non-transitory storage medium) being attached to a drive device.

Instructions from the driving assistance device 100 to the traveling drive force output device 200, the brake device 210, and the steering device 220 are set in the traveling drive force output device 200, the brake device 210, and the steering device 220 so that they are executed with priority over a result of detection from the driving operator 80. With regard to braking, when a braking force based on an operation amount of the brake pedal is greater than an instruction from the driving assistance device 100, the latter may be set to be executed with priority. In addition, communication priority in an in-vehicle LAN may be used as a mechanism for executing instructions from the driving assistance device 100 with priority.

Figure 2:
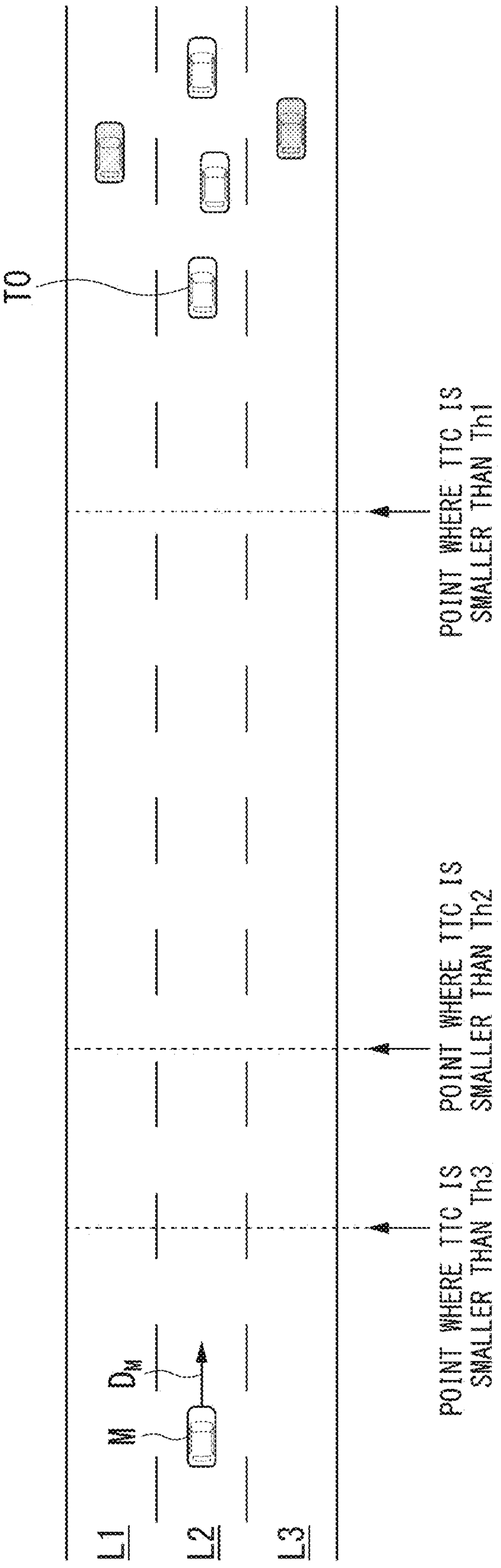
FIG. 2 A diagram which shows an outline of a function of the driving assistance device.

FIG. 2 is a diagram which shows an outline of functions of the driving assistance device 100. Each part of the driving assistance device 100 will be described below with reference to FIG. 2 and FIG. 1. In FIG. 2, the vehicle M is traveling on a three-lane road and is in a lane L2 at the center. $D_M$ is a traveling direction of the vehicle M.

The braking controller 110 refers to the output of the detection device (mentioned above) that detects the presence of objects in front of the vehicle M, and when a degree of proximity between the target object TO among the objects and the vehicle M satisfies a first condition, instructs the brake device 210 and/or the traveling drive force output device 200 to decelerate and stop the vehicle M. The target object TO is an object that is on the same track as the vehicle M and is in a direction of travel of the vehicle M, and is an object with which the vehicle M needs to avoid contact, excluding objects that can be climbed over such as manholes. The braking controller 110 extracts such an object and sets it to the target object TO. In the example of FIG. 2, another vehicle at a rear of the vehicle is set to the target object TO in the conventional method. The track is, for example, a lane, but it may also be a virtual lane that the vehicle M virtually sets on a road surface where there are no road dividing lines. The same applies in the following description.

The "degree of proximity" is expressed by various index values that indicate the degree of proximity between objects. For example, the "degree of proximity" is TTC (Time To Collision), which is an index value calculated by dividing the distance by a relative speed (a direction of approaching each other is set to be positive). When the relative speed is negative (a direction of moving away from each other), the TTC is provisionally set to infinity. The TTC is an index value that indicates a higher degree of proximity as its value becomes smaller. Then, satisfying the "first condition" means, for example, that the TTC is less than a first threshold value Th1. The first threshold value Th1 is, for example, a value of one and several tenths of a [sec]. Instead of TTC, an index value having a similar property, such as headway time, a distance, or other index value, may be used as the "degree of proximity." In addition, TTC adjusted by taking into account acceleration and jerk may be used as the "degree of proximity." In the following description, the "degree of proximity" will be described as TTC.

When the TTC is less than the first threshold value Th1, the braking controller 110 instructs the brake device 210 and/or the traveling drive force output device 200 to output a braking force that decelerates the vehicle M at a first deceleration B1, for example. The first deceleration B1 is, for example, a deceleration of several tenths of a [G] (close to one). As a result, the braking controller 110 quickly decelerates and stops the vehicle M to avoid contact with the target object TO. The ECUs of the brake device 210 and the traveling drive force output device 200 have a function of calculating a brake output, an amount of regenerative control, an amount of engine brake, and the like based on the instructed deceleration, and the ECU determines the respective control amounts on the basis of the instructed deceleration and the speed of the vehicle M. This is a known technology, and a detailed description will be omitted.

An operation of the first preliminary operation controller 112 will be described below, and the steering avoidance controller 120 will be described first.

Figure 3:
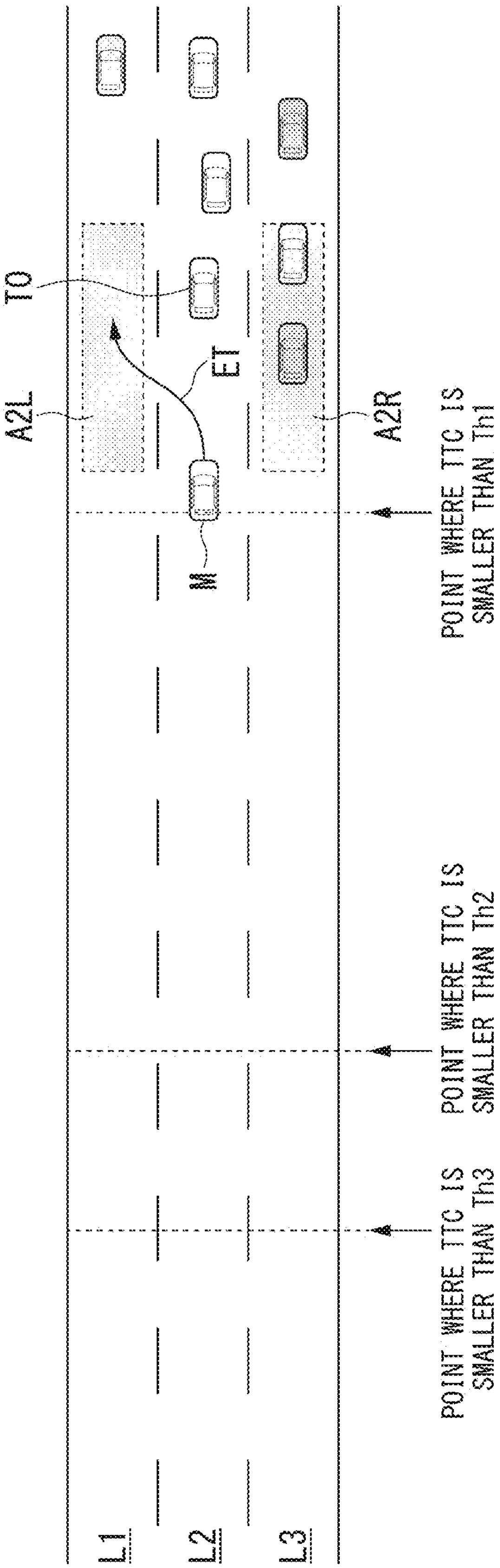
FIG. 3 A diagram which shows an example of an operation situation of a steering avoidance controller.

FIG. 3 is a diagram which shows an example of an operation situation of the steering avoidance controller 120. When the steering avoidance controller 120 determines that it is difficult for the braking controller 110 to stop the vehicle M before the target object TO, it determines whether there is space in which the vehicle M can proceed on tracks (for example, lanes L1 and L2) to the sides of the target object TO, and when it is determined that there is space, it generates an avoidance trajectory ET and instructs the steering device 220 such that the vehicle M proceeds along the avoidance trajectory ET (steering avoidance). For example, the steering avoidance controller 120 determines whether there is an object in a lateral area extending from a little in front of a target vehicle to the rear on both sides of the target vehicle TO, such as areas A2L and A2R shown in FIG. 3, and when there is no object, it determines that there is space in which the vehicle M can proceed on the tracks to the sides of the target object TO. The determination of whether it is difficult for the braking controller 110 to stop the vehicle M before the target object TO may be performed by the braking controller 110 or by the steering avoidance controller 120. The steering avoidance controller 120 also recognizes boundaries of the tracks, for example, by recognizing white lines and road shoulders in a camera image, and when either of the original travelable areas A2L and A2R is not present, for example, when either of the lanes L1 and L3 is not present, it may be determined that an object is present in the area.

Steering avoidance is performed when there is a sudden change in an environment surrounding the vehicle, such as when the target object TO decelerates unexpectedly, or when an object other than the recognized target object TO interrupts between the vehicle M and the target object TO and is set as a new target vehicle TO. In such a situation, the deceleration calculated in advance to stop the vehicle in front of the target vehicle TO may not make it possible to take a response, but a probability of being able to respond to sudden changes in the environment surrounding the vehicle can be increased by having the steering avoidance function.

Preliminary Operation

Figure 4:
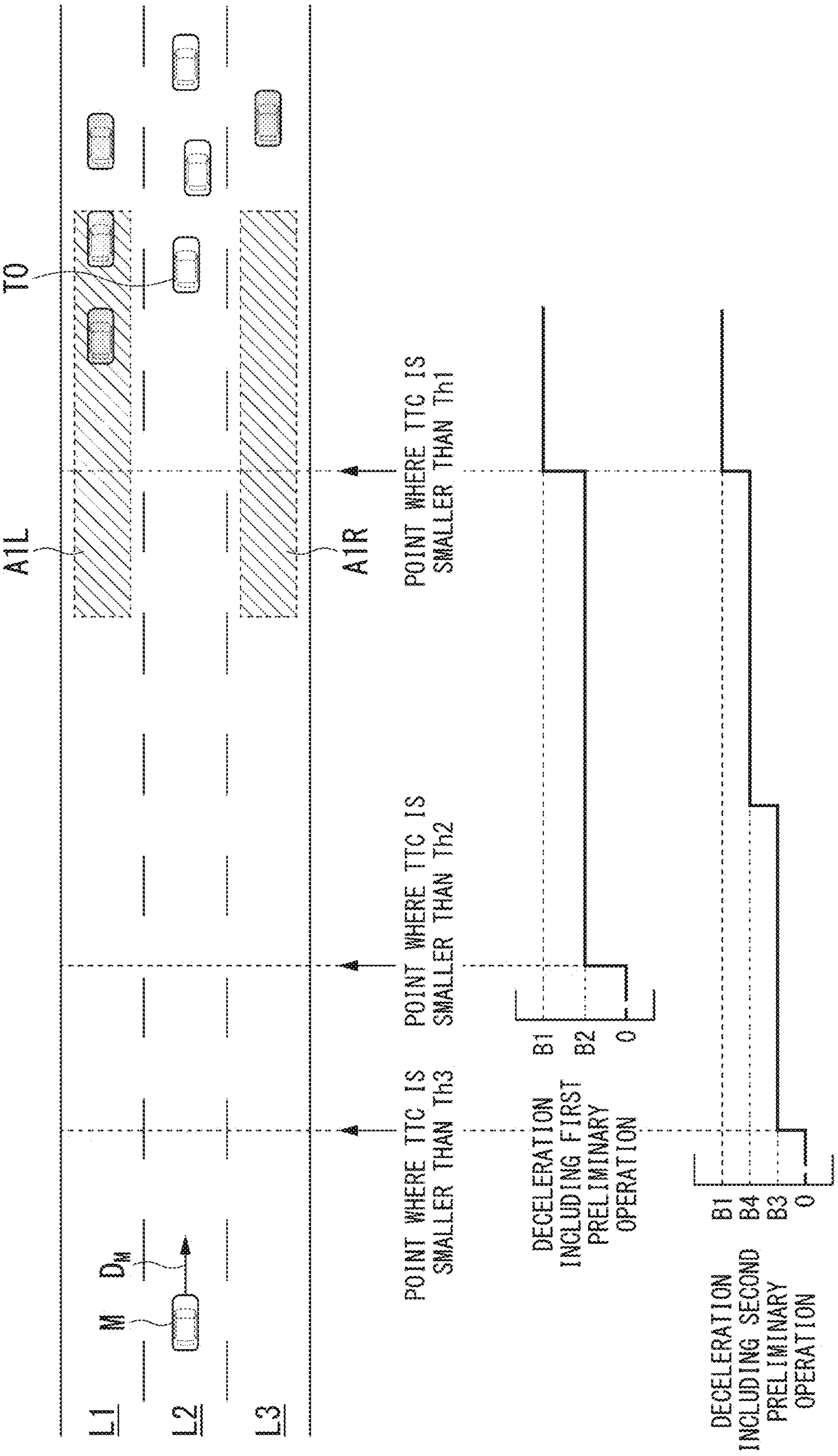
FIG. 4 A diagram for describing a preliminary operation.

Processing of the first preliminary operation controller 112 and the second preliminary operation controller 130 will be described below. FIG. 4 is a diagram for describing a preliminary operation.

When the degree of proximity between the target object TO and the vehicle M satisfies the second condition (for example, when the TTC is less than a second threshold value Th2), the first preliminary operation controller 112 performs a first preliminary operation to inform the driver of the vehicle M of the presence of the target object TO. The first preliminary operation is, for example, an operation of instructing the brake device 210 and/or the traveling drive force output device 200 to output a braking force that decelerates the vehicle M at a second deceleration B2 during a period from when the TTC becomes less than the second threshold value Th2 to when it becomes less than the first threshold value Th1. The second deceleration B2 is a deceleration smaller (closer to zero) than the first deceleration B1. The second threshold value Th2 is a value greater than the first threshold value Th1. Therefore, the first condition is a condition that is satisfied when the degree of proximity is higher than the second condition.

The second preliminary operation controller 130 performs a second preliminary operation to inform the driver of the vehicle M of the presence of the target object TO when the degree of proximity between the target object TO and the vehicle M satisfies a third condition (for example, the TTC is less than a third threshold value Th3) and when it is determined that there is no space in which the vehicle can proceed on any of the tracks to the sides of the target object TO after an avoidance by steering is performed at a time point when the third condition is satisfied. The determination on space in which the vehicle can proceed is performed by the steering avoidance feasibility determiner 132. The third threshold value Th3 is a value greater than the second threshold value Th2. Therefore, the second condition is a condition that is satisfied when the degree of proximity is higher than the third condition.

For example, at the time point when the TTC becomes less than the third threshold value Th3, the steering avoidance feasibility determiner 132 determines whether an object is present in the lateral area extending from a little in front of the target vehicle to the rear on both sides of the target vehicle TO, such as areas A1L and A1R shown in FIG. 4, and when there is no object, it is determined that there is space in which the vehicle M can proceed on the tracks to the sides of the target object TO. Each of the areas A1L and A1R is set to be larger than each of the areas A2L and A2R in consideration of, for example, future uncertain factors. The steering avoidance feasibility determiner 132, like the steering avoidance controller 120, also recognizes the boundaries of the tracks by recognizing, for example, white lines and road shoulders in the camera image, and when either of the original travelable areas A1L and A1R is not present, for example, when either of the lanes L1 and L3 is not present, it may be determined that an object is present in the area. In the example of FIG. 4, since there is no object in the area A1R, the steering avoidance feasibility determiner 132 determines that there is space in which the vehicle M can proceed on the tracks to the sides of the target object TO.

The second preliminary operation is, for example, an operation of instructing the brake device 210 and/or the traveling drive force output device 200 to first output a braking force that decelerates the vehicle M at a third deceleration B3 and then instructing the brake device 210 and/or the traveling drive force output device 200 to output a braking force that decelerates the vehicle M at a fourth deceleration B4 during a period from when the TTC becomes less than the third threshold value Th3 to when it becomes less than the first threshold value Th1. The third deceleration B3 is, for example, a deceleration smaller (closer to zero) than the second deceleration B2, and the fourth deceleration B4 is a deceleration larger than or approximately the same as the second deceleration and smaller than the first deceleration B1. A timing for switching from the third deceleration B3 to the fourth deceleration B4 may be set arbitrarily.

In this manner, the second preliminary operation is started at an earlier timing than the first preliminary operation, and is performed in multiple stages. As described above, in a situation where steering avoidance is possible, a probability of being able to respond quickly to a sudden change in the surrounding environment of the vehicle is high, and a degree of control margin is relatively high. On the other hand, when there is no avoidance space to the sides of the target object, even if the steering avoidance function is provided, it is difficult to execute it, so that the degree of control margin is the same as for a vehicle that can only perform automatic stopping. In other words, in a situation where steering avoidance is difficult, it is preferable to give the driver of the vehicle M a calling for attention earlier and more effectively than in a situation where steering avoidance is possible. According to the present embodiment, the second preliminary operation is started at an earlier timing than the first preliminary operation and is performed in multiple stages, so that an appropriate preliminary operation can be performed according to the surrounding situation of the target object.

Figure 5:
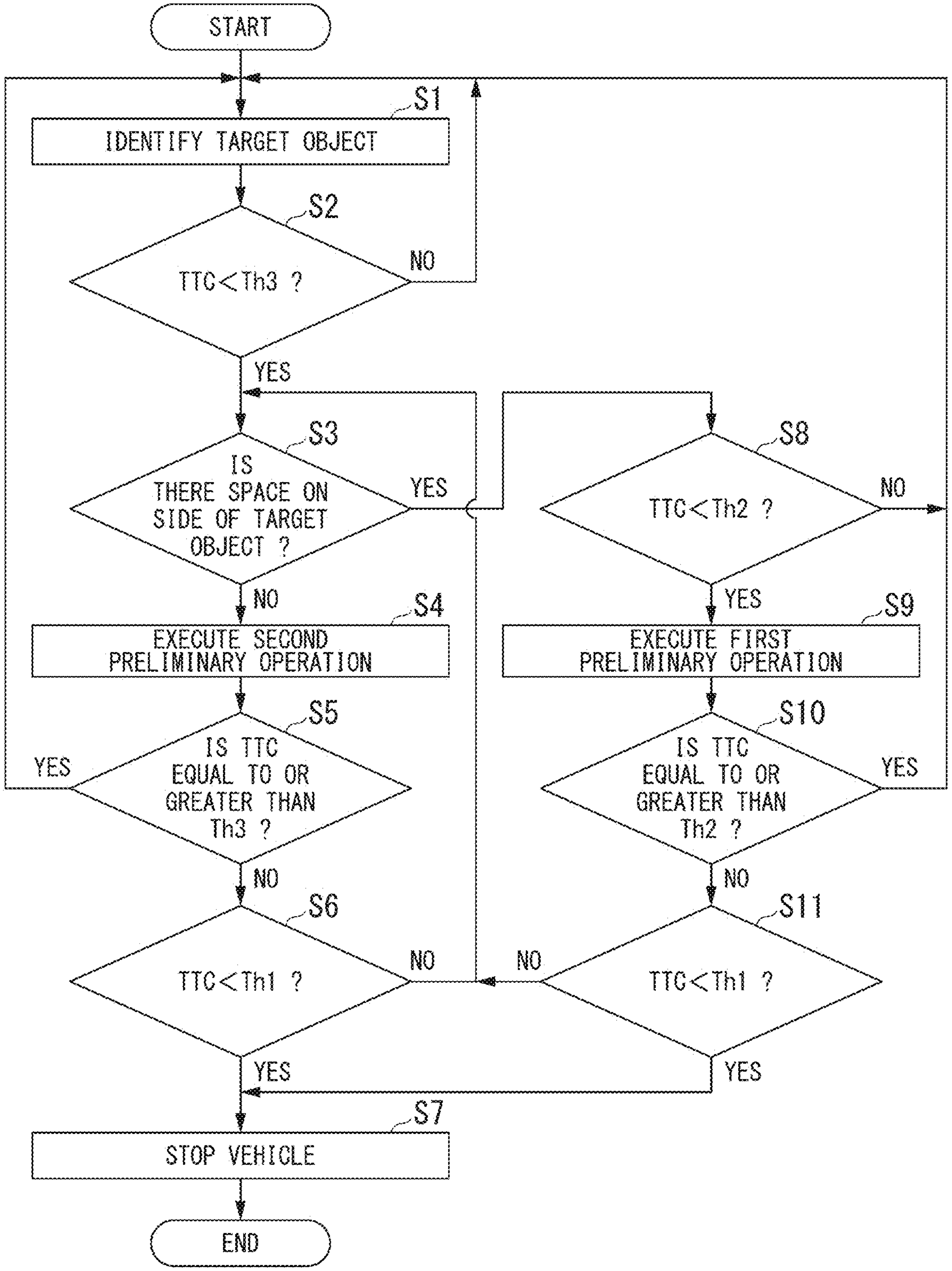
FIG. 5 A flowchart which shows an example of a flow of processing executed by the driving assistance device.

FIG. 5 is a flowchart which shows an example of a flow of processing executed by the driving assistance device 100.

First, the braking controller 110 identifies a target object TO (step S1). Next, the second preliminary operation controller 130 determines whether TTC between the vehicle M and the target object TO is less than the third threshold value Th3 (step S2). When the TTC between the vehicle M and the target object TO is equal to or greater than the third threshold value Th3, the processing returns to step S1.

When it is determined that the TTC between the vehicle M and the target object TO is less than the third threshold value Th3, the steering avoidance feasibility determiner 132 of the second preliminary operation controller 130 determines whether there is space in which the vehicle M can proceed on the tracks to the sides of the target object TO (step S3).

When it is determined that there is no space in which the vehicle M can proceed on the tracks to the sides of the target object TO, the second preliminary operation controller 130 executes the second preliminary operation (step S4). Next, the second preliminary operation controller 130 determines whether the TTC between the vehicle M and the target object TO has increased to be equal to or greater than the third threshold value Th3 (step S5). When it is determined that the TTC between the vehicle M and the target object TO has increased to be equal to or greater than the third threshold value Th3, the processing returns to step S1.

When it is not determined that the TTC between the vehicle M and the target object TO has increased to be equal to or greater than the third threshold value Th3, the braking controller 110 determines whether the TTC between the vehicle M and the target object TO is less than the first threshold value Th1 (step S6). When it is determined that the TTC between the vehicle M and the target object TO is equal to or greater than the first threshold value Th1, the processing returns to step S3. When a positive determination is obtained in step S3, the second preliminary operation is stopped, and subsequent processing from step S8 is executed. When it is determined that the TTC between the vehicle M and the target object TO is less than the first threshold value Th1, the braking controller 110 outputs a braking force that decelerates the vehicle M at the first deceleration B1 to the brake device 210 and/or the traveling drive force output device 200, thereby decelerating and stopping the vehicle M (step S7). At this time, as described above, steering avoidance may be performed instead of (or in addition to) decelerating and stopping the vehicle M.

When a positive determination is obtained in step S3, that is, when the TTC between the vehicle M and the target object TO is less than the third threshold value Th3 and there is space in which the vehicle M can proceed on the tracks to the sides of the target object TO, the first preliminary operation controller 112 of the braking controller 110 determines whether the TTC between the vehicle M and the target object TO is less than the second threshold value Th2 (step S8). When it is determined that the TTC between the vehicle M and the target object TO is equal to or greater than the second threshold value Th2, the processing returns to step S1.

When it is determined that the TTC between the vehicle M and the target object TO is less than the second threshold value Th2, the first preliminary operation controller 112 executes the first preliminary operation (step S9). Next, the first preliminary operation controller 112 determines whether the TTC between the vehicle M and the target object TO has increased to be equal to or greater than the second threshold value Th2 (step S10). When it is determined that the TTC between the vehicle M and the target object TO has increased to be equal to or greater than the second threshold value Th2, the processing returns to step S1.

When it is not determined that the TTC between the vehicle M and the target object TO has increased to be equal to or greater than the second threshold value Th2, the braking controller 110 determines whether the TTC between the vehicle M and the target object TO is less than the first threshold value Th1 (step S11). When it is determined that the TTC between the vehicle M and the target object TO is equal to or greater than the first threshold value Th1, the processing returns to step S3. When a negative determination is obtained in step S3, the first preliminary operation is stopped, and the subsequent processing from step S4 is executed. When it is determined that the TTC between the vehicle M and the target object TO is less than the first threshold value Th1, the braking controller 110 outputs the first deceleration B1 to the brake device 210 and/or the traveling drive force output device 200 to decelerate and stop the vehicle M (step S7).

Control According to Recognized Situation of Target Object and Situation of Side Track Control according to a recognized situation of the target object and a situation of a side track will be described below. The second preliminary operation controller 130 performs the third preliminary operation when the presence of the target object TO is unknown and the tracks to the sides (for example, the lanes L1 and L3 in FIG. 2) of a track on which the vehicle M is present (for example, the lane L2 in FIG. 2) are in a congested state. "The side track is in the congested state" means, for example, "areas from a position corresponding to the position of the vehicle M to a reference distance ahead in the direction of travel on the side tracks are congested."

The third preliminary operation is, for example, an operation of instructing the HMI 30 to perform display, output sound, or output vibration to call attention, and then instructing the brake device 210 and/or the traveling drive force output device 200 to output a braking force that decelerates the vehicle M at a deceleration smaller than the first deceleration B1. The third preliminary operation may include an operation of instructing the brake device 210 and the traveling drive force output device 200 to suppress acceleration or deceleration of the vehicle M until the target object TO is recognized. Suppressing the acceleration or deceleration of the vehicle M may be realized by suppressing a jerk of the vehicle M. For example, the second preliminary operation controller 130 instructs the brake device 210 and the traveling drive force output device 200 to set an upper limit value for the jerk. As a result, ECUs of each of the brake device 210 and the traveling drive force output device 200 impose limits on the amount of operation generated in response to a control instruction, and as a result, the acceleration or deceleration of the vehicle M is suppressed.

"The presence of the target object TO is unknown" means, for example, a state in which it is unclear whether the target object TO is present or is not present because recognition processing of the target object TO, which is performed by referring to an output of the detection device (described above), is not performed with sufficient reliability, and does not include a state in which it has been confirmed with sufficient reliability that the target object TO is "not present." For example, when there is a sudden weather change, when direct sunlight is incident on the camera 10, or the like, a situation in which "the presence of the target object TO is unknown" may occur. On the other hand, a situation where a surrounding situation of the vehicle M can be recognized far enough in the direction of travel and it is clear that there is no preceding vehicle is not the situation in which "the presence of the target object TO is unknown." Even in the situation in which the "presence of the target object TO is unknown," there may be cases in which a congested state can be detected in an area close to the vehicle M on the side tracks. An entity that performs the recognition processing (which may be the object recognition device 16, the braking controller 110, or the second preliminary operation controller 130) is configured to output a reliability of a recognition result while performing the recognition processing. A congested state is a state defined as "the average speed on the track is equal to or less than a predetermined speed" or "an average inter-vehicle distance on the track is equal to or less than a predetermined distance."

Incidentally, there may be two "side tracks" on the left and right of the track on which the vehicle M is present, or there may be only one, or there may be none at all. In this regard, the driving assistance device 100 may adopt either of the following two control patterns. In the following description, the track on which the vehicle M is present is referred to as a "host lane" and the "side tracks" are referred to as the adjacent lanes.

Pattern A

When there are two adjacent lanes on the left and right and the presence of the target object TO is unknown, the second preliminary operation controller 130 may perform the third preliminary operation only when both adjacent lanes on the left and right are in a congested state, and may not perform the third preliminary operation when any one of the adjacent lanes is not in a congested state.

Figure 6:
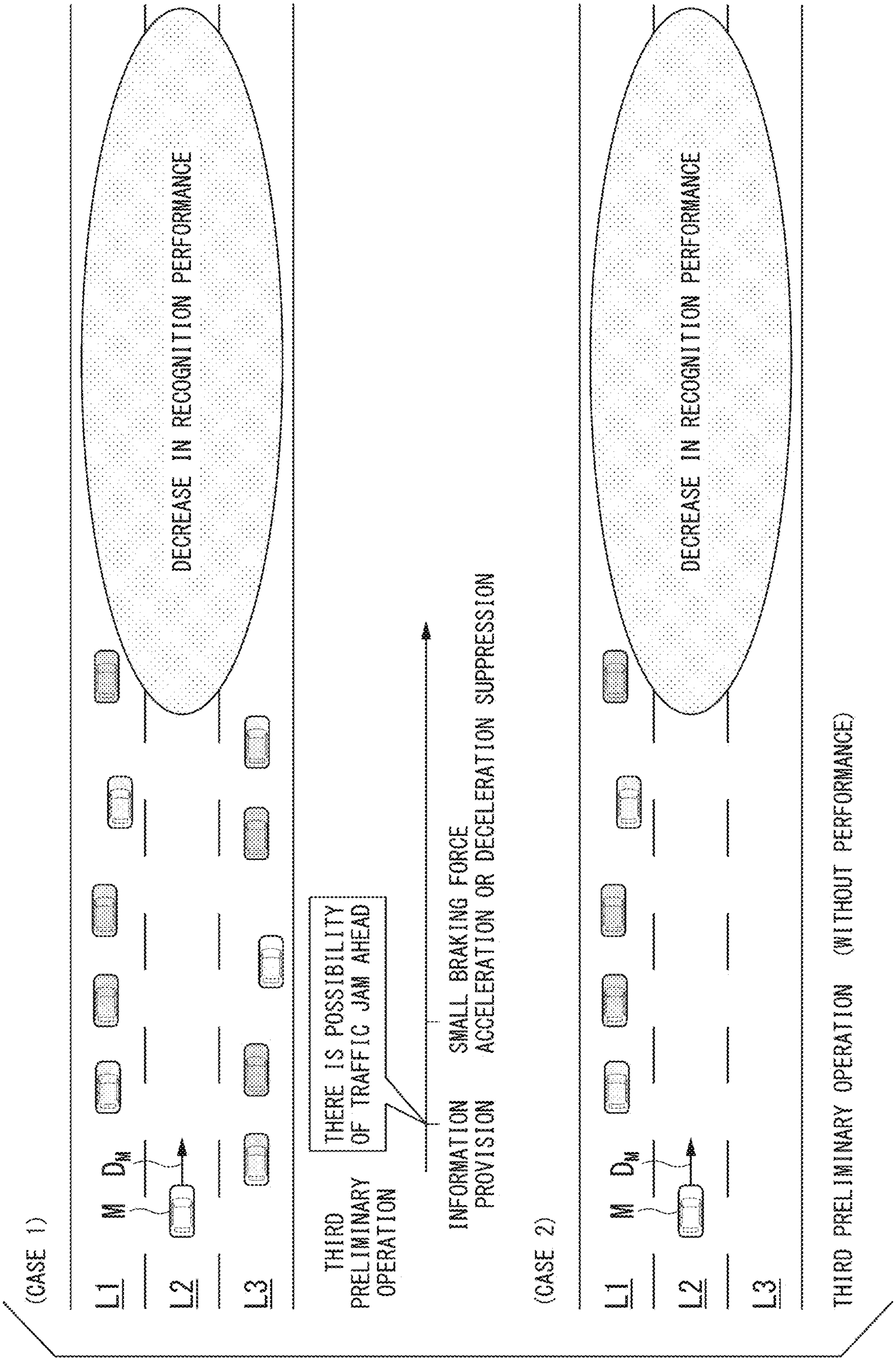
FIG. 6 A diagram for describing whether a third preliminary operation in a pattern A can be executed.

FIG. 6 is a diagram for describing whether the third preliminary operation can be executed in a pattern A. In FIG. 6, when there are two adjacent lanes on the left and right, and the presence of the target object TO is unknown, a case 1 shows a case where both adjacent lanes on the left and right are in a congested state. In such a case, the second preliminary operation controller 130 performs the third preliminary operation. Information output in the third preliminary operation is, for example, information such as "There is a possibility of a traffic jam ahead." In such a situation, there is a high possibility that there will be no room to perform steering avoidance at the time of an emergency, and it is highly necessary to have the driver prepare for braking and stopping in advance.

In FIG. 6, when there are two adjacent lanes on the left and right, and the presence of the target object TO is unknown, a case 2 is a case where neither of the adjacent lanes is in a congested state. In such a case, the second preliminary operation controller 130 does not perform the third preliminary operation. This is because there is room to perform steering avoidance at the time of an emergency because at least one adjacent lane on one side is not in a congested state.

When there is only one adjacent lane on either the left or right, the second preliminary operation controller 130 when the pattern A is adopted determines that "both the left and right adjacent lanes are in a congested state" if the adjacent lane is in a congested state, and determines that "neither the left nor right adjacent lane is in a congested state" if the adjacent lane is not in a congested state. Furthermore, when there is no adjacent lane, the second preliminary operation controller 130 considers that "both adjacent lanes on the left and right are in a congested state."

Figure 7:
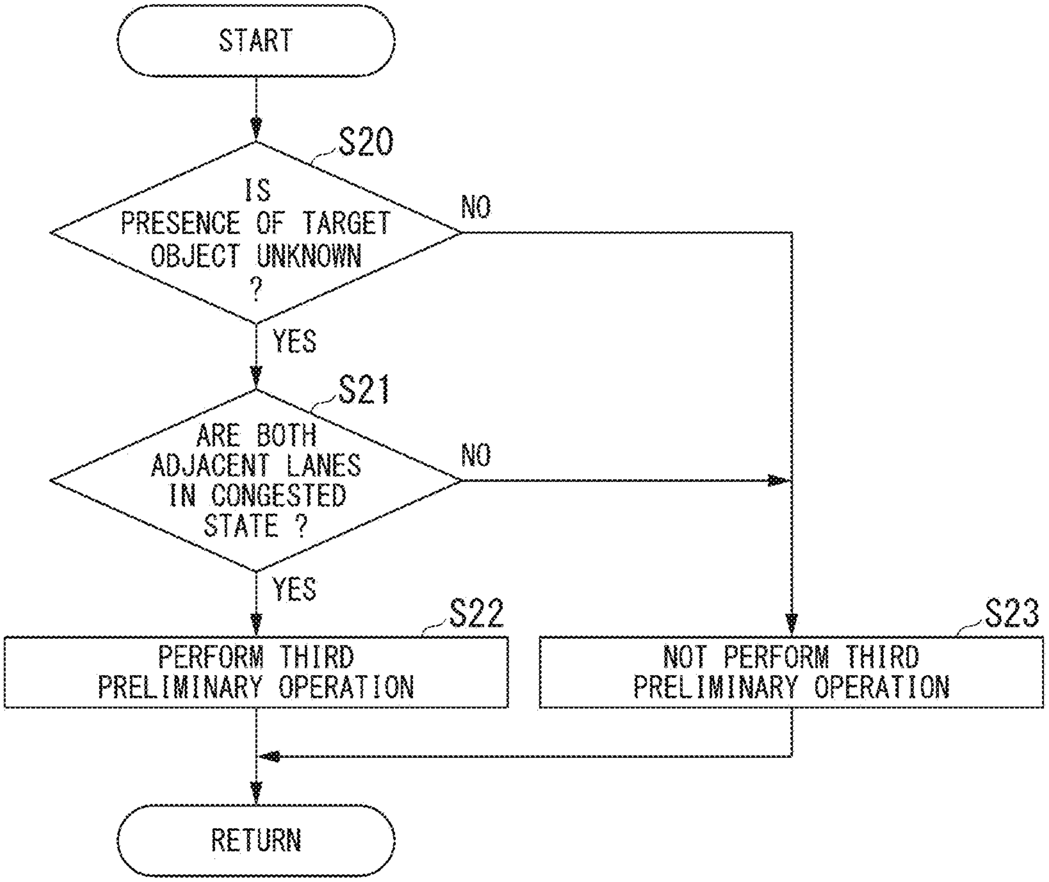
FIG. 7 A flowchart which shows an example of a flow of processing executed by a second preliminary operation controller 130 when the pattern A is adopted.

FIG. 7 is a flowchart which shows an example of a flow of processing executed by the second preliminary operation controller 130 when the pattern A is adopted. First, the second preliminary operation controller 130 determines whether it is a situation in which "the presence of the target object TO is unknown" (step S20). When it is determined that it is a situation in which "the presence of the target object TO is unknown," the second preliminary operation controller 130 determines whether both adjacent lanes are in a congested state (step S21). When it is determined that both adjacent lanes are in a congested state, the second preliminary operation controller 130 performs a third preliminary operation (step S22). On the other hand, when a negative determination result is obtained in either step S20 or step S21, the second preliminary operation controller 130 does not perform the third preliminary operation (step S23).

Pattern B

The second preliminary operation controller 130 may be configured to perform the third preliminary operation when there are two adjacent lanes on the left and right and the presence of the target object TO is unknown, and when both adjacent lanes on the left and right are in a congested state, not to perform the third preliminary operation when one adjacent lane is in a congested state and the other adjacent lane is not in a congested state, and when the congested adjacent lane is connected to a branch road (within a predetermined distance in the traveling direction of the vehicle M), and to perform the third preliminary operation when the congested adjacent lane is not connected to a branch road.

Figure 8:
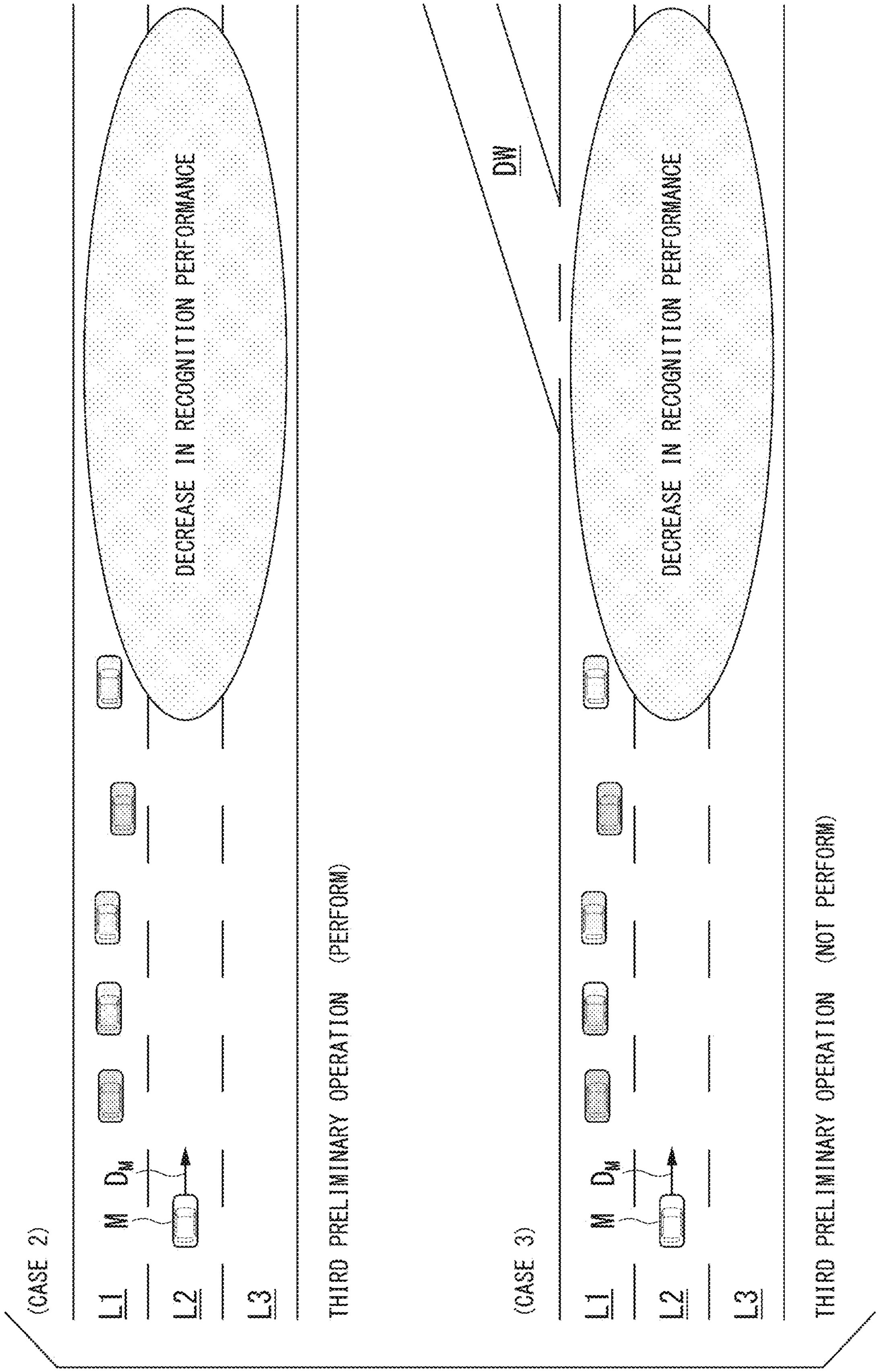
FIG. 8 A diagram for describing whether a third preliminary operation in a pattern B can be executed.

FIG. 8 is a diagram for describing whether the third preliminary operation can be performed in a pattern B. Case 1 is common with the pattern A, and therefore illustration and description thereof are omitted. Case 2 shows a scene similar to one in the pattern A, but the third preliminary operation is performed in the pattern B. In Case 3, one of the adjacent lanes is not in a congested state, and the congested adjacent lane is connected to a branch road DW. In such a case, the third preliminary operation is not performed. This is because it is presumed that a congested state has occurred because vehicles traveling on the branch road DW are lined up. In the pattern B, for Case 2 where such presumption does not apply, control is performed in a more cautious manner, and the third preliminary operation is performed. The presence of a branch road in the traveling direction of the vehicle M (more precisely, the presence of a branch road within a range of a predetermined distance from the vehicle M in the traveling direction of the vehicle M) is recognized by, for example, comparing the position of the vehicle M measured by the navigation device 50 with map information.

The second preliminary operation controller 130 when the pattern B is adopted does not perform the third preliminary operation when there is an adjacent lane only on one side, and the adjacent lane is in a congested state and connected to a branch road, and does not perform the third preliminary operation when the adjacent lane is in a congested state and is not connected to a branch road. In addition, when the adjacent lane is not in a congested state, the second preliminary operation controller 130 considers that "both adjacent lanes on the left and right are not in a congested state." When there are no adjacent lanes, the second preliminary operation controller 130 considers that "both adjacent lanes on the left and right are in a congested state."

Figure 9:
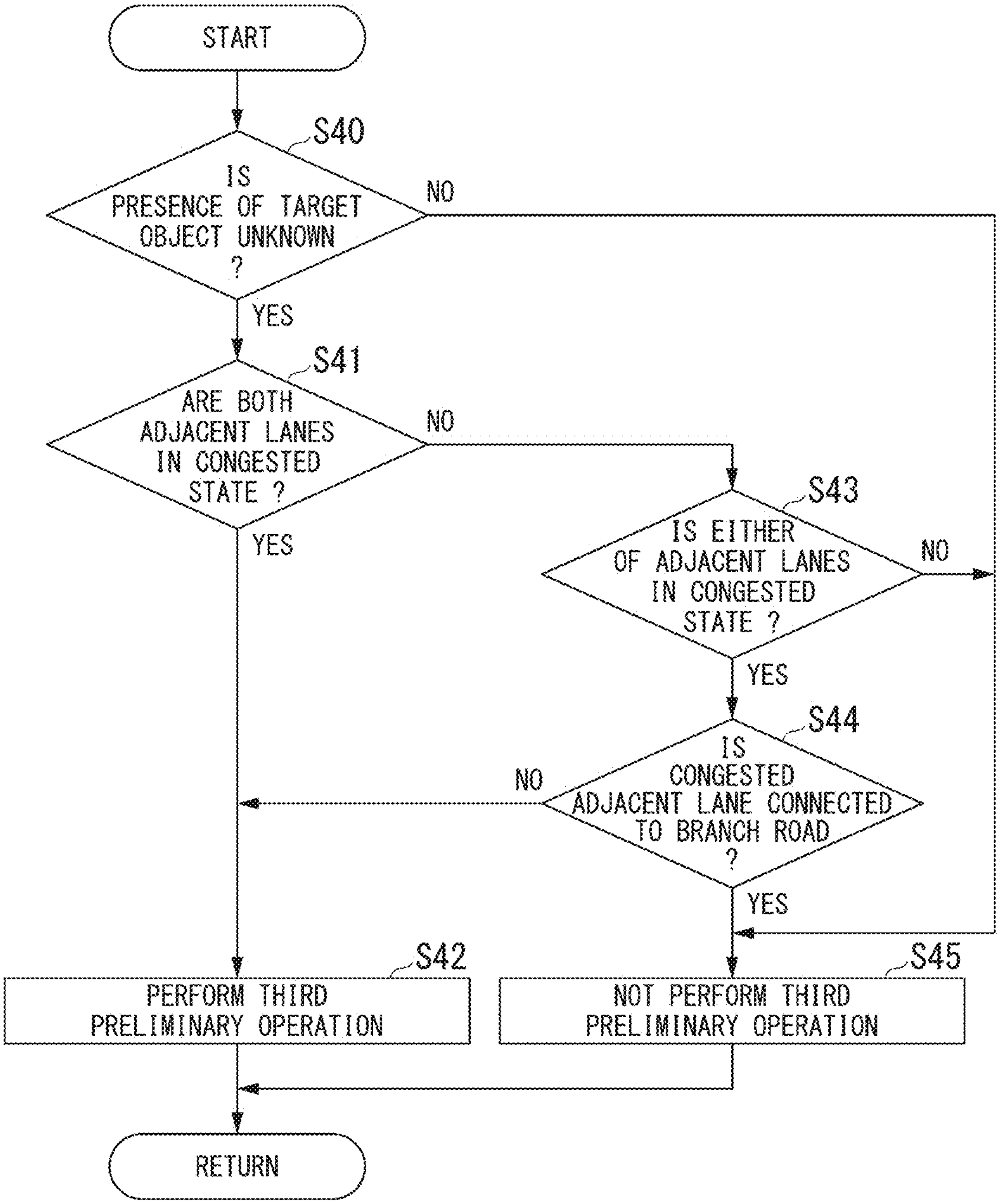
FIG. 9 A flowchart which shows an example of a flow of processing executed by the second preliminary operation controller 130 when the pattern B is adopted.

FIG. 9 is a flowchart which shows an example of a flow of processing executed by the second preliminary operation controller 130 when the pattern B is adopted. First, the second preliminary operation controller 130 determines whether a situation is "the presence of the target object TO is unknown" (step S40). When it is determined that the situation is "the presence of the target object TO is unknown," the second preliminary operation controller 130 determines whether both adjacent lanes are in a congested state (step S41). When it is determined that both adjacent lanes are in a congested state, the second preliminary operation controller 130 performs the third preliminary operation (step S42). When the situation is not "the presence of the target object TO is unknown," the second preliminary operation controller 130 does not perform the third preliminary operation (step S45).

When a negative determination result is obtained in step S41, the second preliminary operation controller 130 determines whether either of the adjacent lanes is in a congested state (step S43). When it is determined that either of the adjacent lanes is in a congested state, the second preliminary operation controller 130 determines whether the congested adjacent lane is connected to a branch road (step S44). When it is determined that the congested adjacent lane is not connected to the branch road, the second preliminary operation controller 130 performs the third preliminary operation (step S42). When it is determined that the congested adjacent lane is connected to the branch road, the second preliminary operation controller 130 does not perform the third preliminary operation (step S45). When a negative determination result is obtained in step S43, the second preliminary operation controller 130 does not perform the third preliminary operation (step S45).

According to the embodiment described above, when the degree of proximity between the target object TO and the vehicle M satisfies the third condition, and when it is determined that there is no space in which the vehicle can proceed on any of the tracks to the sides of the target object TO after avoidance by the steering is performed, the second preliminary operation is performed, and when the presence of the target object TO is unknown and the tracks to the sides of the track on which the vehicle M is present are in a congested state, the third preliminary operation is performed, thereby making it possible to perform an appropriate preliminary operation according to a recognized situation of the target object TO.

In the embodiment described above, when a branch road to a destination set in the navigation device 50 is on either a left or right side of a lane in which the vehicle M is traveling, a lane change may be forcibly performed during a preliminary operation. This will result in moving the vehicle M toward the destination, and guiding the vehicle M to a state where there is no target object near the vehicle M.

The embodiment described above can be expressed as follows.

A driving assistance device includes a storage medium configured to store computer-readable instructions, and a processor connected to the storage medium, in which the processor executes the computer-readable instructions to refer to an output of a detection device that detects presence of objects in front of a vehicle, and perform one or both of instructing a braking device of the vehicle to stop the vehicle when an index value obtained by dividing a distance between a target object among the objects and the vehicle by a relative speed is less than a first threshold value, and instructing a steering device of the vehicle to avoid contact with the target object by steering, perform a first preliminary operation when the index value is less than a second threshold value, perform a second preliminary operation when the index value is less than a third threshold value, and it is determined that there is no space in which the vehicle can proceed after avoidance by the steering is performed in any of tracks to sides of the target object at a time point when the index value is less than the third threshold value, and perform a third preliminary operation when presence of the target object is unknown and tracks to sides of a track on which the vehicle is present are in a congested state, the first threshold value is smaller than the second threshold value, the second threshold value is smaller than the third threshold value, both the first preliminary operation and the second preliminary operation are operations of instructing the braking device to output a braking force smaller than a braking force that the braking controller instructs the braking device to output, and the second preliminary operation is an operation of instructing the braking device to output the braking force at an earlier timing than the first preliminary operation.

The above describes a form for carrying out the present invention using an embodiment, but the present invention is not limited to such an embodiment, and various modifications and substitutions can be made within a range not departing from the gist of the present invention.

REFERENCE SIGNS LIST

10 Camera
12 Radar device
14 LIDAR
16 Object recognition device
80 Driving operator
100 Driving assistance device
110 Braking controller
112 First preliminary operation controller
120 Steering avoidance controller
130 Second preliminary operation controller
132 Steering avoidance feasibility determiner
200 Traveling drive force output device
210 Brake device
220 Steering device

What is claimed is:

1. A driving assistance device comprising:

a storage medium configured to store computer-readable instructions; and one or more processors connected to the storage medium, wherein the one or more processors execute the computer-readable instructions to:

refer to an output of a detection device that detects presence of objects in front of a vehicle, and instruct a braking device of the vehicle to stop the vehicle when a degree of proximity between a target object among the objects and the vehicle satisfies a first condition;

instruct a steering device of the vehicle to avoid contact with the target object by steering;

perform a first preliminary operation when the degree of proximity satisfies a second condition;

perform a second preliminary operation when the degree of proximity satisfies a third condition and it is determined that there is no space in which the vehicle is able to proceed after avoidance by the steering is performed in any of tracks to sides of the target object at a time point when the third condition is satisfied; and perform a third preliminary operation when a presence of the target object is unknown and tracks to sides of a track on which the vehicle is present are in a congested state, the first condition is a condition that is satisfied when the degree of proximity is higher than the second condition, and the second condition is a condition that is satisfied when the degree of proximity is higher than the third condition, wherein the one or more processors execute the computer-readable instructions:

to perform the third preliminary operation when the presence of the target object is unknown and all of the tracks to the sides of the track on which the vehicle is present are in a congested state; the tracks to the sides of the track being lanes on left and right of lane in which the vehicle drives and the lanes being extend to direction which the lane in which the vehicle drives extends to, and not to perform the third preliminary operation when at least one of the tracks to the sides of the track on which the vehicle is present is not in a congested state.

2. The driving assistance device according to claim 1, wherein the second preliminary operation is an operation started at an earlier timing than the first preliminary operation.

3. The driving assistance device according to claim 1, wherein at least one of the first preliminary operation and the second preliminary operation is an operation of instructing the braking device to output a braking force smaller than a braking force that the braking device is instructed to output to stop the vehicle when a degree of proximity between a target object among the objects and the vehicle satisfies the first condition.

4. The driving assistance device according to claim 3, wherein both the first preliminary operation and the second preliminary operation are operations of instructing the braking device to output a braking force smaller than a braking force that the braking device is instructed to output to stop the vehicle when a degree of proximity between a target object among the objects and the vehicle satisfies the first condition, and a braking force that is initially output in the second preliminary operation is smaller than a braking force that is initially output in the first preliminary operation.

5. The driving assistance device according to claim 4, wherein the third preliminary operation is an operation of instructing an output device to perform a display, a voice output, or a vibration output for calling attention, and then instructing the braking device to output a braking force smaller than a braking force that a braking control device is instructed to output to stop the vehicle when the degree of proximity between a target object among the objects and the vehicle satisfies the first condition.

6. The driving assistance device according to claim 1, wherein the third preliminary operation includes an operation of instructing the braking device and a traveling drive force output device of the vehicle to suppress acceleration or deceleration of the vehicle until the target object is recognized.

7. The driving assistance device according to claim 1, wherein the second preliminary operation is an operation started at an earlier timing than the first preliminary operation, and at least one of the first preliminary operation and the second preliminary operation is an operation of instructing the braking device to output a braking force smaller than a braking force that the braking device is instructed to output to stop the vehicle when a degree of proximity between a target object among the objects and the vehicle satisfies the first condition.

8. The driving assistance device according to claim 1, wherein the second preliminary operation is an operation started at an earlier timing than the first preliminary operation, at least one of the first preliminary operation and the second preliminary operation is an operation of instructing the braking device to output a braking force smaller than a braking force that a braking control unit instructs the braking device to output, both the first preliminary operation and the second preliminary operation are operations of instructing the braking device to output a braking force smaller than a braking force that the braking control unit instructs the braking device to output, and a braking force that is initially output in the second preliminary operation is smaller than a braking force that is initially output in the first preliminary operation.

9. The driving assistance device according to claim 1, the congested state is a state in which an average speed of a vehicle on the track is equal to or less than a predetermined speed or an average inter-vehicle distance on the track is equal to or less than a predetermined distance.

10. A driving assistance device comprising:

a storage medium configured to store computer-readable instructions; and one or more processors connected to the storage medium, wherein the one or more processors execute the computer-readable instructions to:

refer to an output of a detection device that detects presence of objects in front of a vehicle, and instruct a braking device of the vehicle to stop the vehicle when a degree of proximity between a target object among the objects and the vehicle satisfies a first condition;

instruct a steering device of the vehicle to avoid contact with the target object by steering;

perform a first preliminary operation when the degree of proximity satisfies a second condition;

perform a second preliminary operation when the degree of proximity satisfies a third condition and it is determined that there is no space in which the vehicle is able to proceed after avoidance by the steering is performed in any of tracks to sides of the target object at a time point when the third condition is satisfied; and perform a third preliminary operation when a presence of the target object is unknown and tracks to sides of a track on which the vehicle is present are in a congested state, the first condition is a condition that is satisfied when the degree of proximity is higher than the second condition, and the second condition is a condition that is satisfied when the degree of proximity is higher than the third condition, wherein the one or more processors execute the computer-readable instructions:

to perform the third preliminary operation when the presence of the target object is unknown and all of the tracks to the sides of the track on which the vehicle is present are in a congested state;

not to perform the third preliminary operation when the presence of the target object is unknown, there are tracks on the left and right of the track on which the vehicle is present, only one of the tracks is in a congested state, and a branch road is connected to the track in a congested state; and to perform the third preliminary operation when the presence of the target object is unknown, there are tracks on a left and right of the track on which the vehicle is present, only one of the tracks is in a congested state, and no branch road is connected to the track in a congested state.

11. A driving assistance device comprising:

a storage medium configured to store computer-readable instructions; and one or more processors connected to the storage medium, wherein the one or more processors execute the computer-readable instructions to:

refer to an output of a detection device that detects presence of objects in front of a vehicle, and instruct a braking device of the vehicle to stop the vehicle when a degree of proximity between a target object among the objects and the vehicle satisfies a first condition;

instruct a steering device of the vehicle to avoid contact with the target object by steering;

perform a first preliminary operation when the degree of proximity satisfies a second condition;

perform a second preliminary operation when the degree of proximity satisfies a third condition and it is determined that there is no space in which the vehicle is able to proceed after avoidance by the steering is performed in any of tracks to sides of the target object at a time point when the third condition is satisfied; and perform a third preliminary operation when a presence of the target object located a first distance ahead of the vehicle is unknown and tracks to sides of a track on which the vehicle is present are in a congested state, the tracks to sides of the track being tracks before the first distance, the tracks to sides of the track being lanes on left and right of lane in which the vehicle drives and the lanes being extend to direction which the lane in which the vehicle drives extends to, the first condition is a condition that is satisfied when the degree of proximity is higher than the second condition, and the second condition is a condition that is satisfied when the degree of proximity is higher than the third condition.

12. The driving assistance device according to claim 11, the congested state is a state in which an average speed of a vehicle on the track is equal to or less than a predetermined speed or an average inter-vehicle distance on the track is equal to or less than a predetermined distance.

* * * * *